(12) United States Patent
Chen

(10) Patent No.: US 12,484,548 B2
(45) Date of Patent: Dec. 2, 2025

(54) FEEDING APPARATUS AND METHOD FOR ADJUSTING THE AMOUNT DISCHARGED THEREOF

(71) Applicant: CHICONY ELECTRONICS CO., LTD., New Taipei (TW)

(72) Inventor: Chien-Yueh Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 310 days.

(21) Appl. No.: 18/469,353

(22) Filed: Sep. 18, 2023

(65) Prior Publication Data
US 2024/0292810 A1 Sep. 5, 2024

(30) Foreign Application Priority Data
Mar. 2, 2023 (TW) ................................ 112107615

(51) Int. Cl.
*A01K 5/02* (2006.01)
*B01F 25/00* (2022.01)

(52) U.S. Cl.
CPC ............ *A01K 5/0241* (2013.01); *B01F 25/00* (2022.01); *A01K 5/0291* (2013.01)

(58) Field of Classification Search
CPC ...... A01K 5/0241; A01K 5/0291; B01F 25/00
See application file for complete search history.

(56) References Cited

U.S. PATENT DOCUMENTS

| | | | |
|---|---|---|---|
| 8,393,497 B2 * | 3/2013 | Fontaine | B65B 1/22 366/279 |
| 2012/0085288 A1 * | 4/2012 | Salinas | A01K 5/0225 119/51.02 |
| 2021/0307289 A1 * | 10/2021 | Baxter | A01K 5/0225 |
| 2024/0292810 A1 * | 9/2024 | Chen | A01K 5/0241 |

FOREIGN PATENT DOCUMENTS

| | | | | |
|---|---|---|---|---|
| CN | 112471032 A | | 3/2021 | |
| JP | H10304827 A | * | 11/1998 | |
| TW | M460531 U | | 9/2013 | |
| WO | WO-2013003273 A2 | * | 1/2013 | .......... B01F 35/4122 |

* cited by examiner

*Primary Examiner* — Bob Zadeh
(74) *Attorney, Agent, or Firm* — MUNCY, GEISSLER, OLDS & LOWE, P.C.

(57) ABSTRACT

A feeding apparatus includes an accommodating tank, a diverting module, a discharge assembly, three optical sensors and a control module. The accommodating tank includes a bottom opening and accommodates the materials. The diverting module includes a driving unit and a blade unit. The blade unit is disposed at the accommodating tank and corresponds to the bottom opening. The discharge assembly includes a storage tank, a discharging opening and a pusher. The accommodating tank is disposed in the storage tank to form a storage space in the storage tank. The pusher moves between the bottom of the storage tank and the discharging opening. The three optical sensors are disposed on the storage tank and correspond to the storage space to form a high-level detection plane and a low-level detection plane. The control module connects to the driving unit, the pusher and the three optical sensors.

19 Claims, 9 Drawing Sheets

```
┌──────────────────────────────────────────────────────────┐
│ The control module controls the driving unit to drive the│
│ blade uni to move the materials according to an initial  │──S10
│ setup instruction such that a portion of the materials   │
│ enters into the storage space from the bottom opening.   │
└──────────────────────────────────────────────────────────┘
                            ▼
┌──────────────────────────────────────────────────────────┐
│ When the materials within the storage space have         │
│ accumulated to the high-level detection plane, the control│──S20
│ module stops the driving unit and controls the pusher to │
│ move toward the discharging opening.                     │
└──────────────────────────────────────────────────────────┘
                            ▼
┌──────────────────────────────────────────────────────────┐
│ The control module adjusts a default driving amount of the│
│ driving unit based on an initial detection result from the│──S30
│ three optical sensors to generate a first driving amount.│
└──────────────────────────────────────────────────────────┘
                            ▼
┌──────────────────────────────────────────────────────────┐
│ According to a feeding instruction, the control module   │
│ controls the driving unit using the first driving amount to│
│ drive the blade unit to move the materials such that a   │──S40
│ portion of the materials enters the storage space through│
│ the bottom opening.                                      │
└──────────────────────────────────────────────────────────┘
                            ▼
┌──────────────────────────────────────────────────────────┐
│ The control module controls the pusher to discharge a    │
│ portion of the materials within the storage space through│──S50
│ the discharging opening.                                 │
└──────────────────────────────────────────────────────────┘
                            ▼
┌──────────────────────────────────────────────────────────┐
│ The control module generates a subsequent operation      │
│ instruction according to a level detection result from the│
│ three optical sensors and a force detection result from the│──S60
│ pressure sensor.                                         │
└──────────────────────────────────────────────────────────┘
```

FIG. 7A

FEEDING APPARATUS AND METHOD FOR ADJUSTING THE AMOUNT DISCHARGED THEREOF

BACKGROUND

1. Technical Field

The disclosure relates to a feeding apparatus, and particularly to a feeding apparatus capable of quantitatively supplying food materials.

2. Description of the Related Art

Pet ownership is increasing worldwide, but pet owners with busy lives can have find it difficult to feed their pets regularly. To solve the problem of the pet owners being unable to feed their pets when they are outside the home, an automatic feeding apparatus is available on the market. The pet owner can put the pet food into a storage chamber (i.e., an accommodating tank) of the feeding apparatus directly; then this kind of feeding apparatus can provide a meal of pet food at a predetermined time. In addition to the daily two or three meals, the pet owners often reward pets by giving them pet food or snacks. Therefore, another automatic feeding apparatus capable of propelling pet food toward a pet is commercially available, and this kind of feeding apparatus enhances the interaction between the pet and pet owner.

This type of automatic feeding apparatus (i.e., feeding a pet by ejecting food) usually has a two-stage discharge mechanism. The first stage involves pushing a small amount of pet food from the accommodating tank into the ejection channel, and in the second stage, the small amount of pet food is ejected to the outside of the automatic feeding apparatus by an ejection mechanism. By using the aforementioned two-stage discharge mechanism, only a small amount of pet food is ejected to prevent the pet food from becoming stuck in the automatic feeding apparatus and thereby ensure normal operation.

However, different brands or types of pet food have different sizes of grains or pellets, and current automatic feeding apparatus cannot adjust the amount of pet food pushed into the ejection channel from the accommodating tank according to the grain size of the pet food. Specifically, when the grain size of the pet food is larger, it may be difficult to push the pet food into the ejection channel or the pet food may not be propelled to the outside of the automatic feeding apparatus. In contrast, when the grain size of the pet food is smaller, it may be possible to push too many grains into the ejection channel at once, which may cause the ejection mechanism to malfunction and work ineffectively. In other words, the current automatic feeding apparatus cannot adjust the amount of pet food discharged in the first stage, and the flow and ejection of the pet food may be impeded or interrupted. Therefore, the prior art still has room for improvement.

SUMMARY

In view of the aforesaid drawbacks of the prior art, it is an objective of the disclosure to provide a feeding apparatus having three optical sensors to address the limitations of the prior art, namely, that a conventional automatic feeding apparatus cannot adjust the amount of pet food discharged, and the flow and ejection of the pet food may be impeded or interrupted.

In order to achieve the above objectives, the disclosure provides a feeding apparatus, which comprises an accommodating tank, a diverting module, a discharge assembly, three optical sensors and a control module. The accommodating tank has a bottom opening and accommodates a plurality of materials. The diverting module comprises a driving unit and a blade unit. The driving unit connects to the blade unit. The blade unit is disposed in the accommodating tank and corresponds to the bottom opening. The discharge assembly comprises a storage tank, a discharging opening and a pusher. The accommodating tank is disposed in the storage tank to form a storage space within the storage tank. The storage space is communicated with the bottom opening and the discharging opening. The pusher is disposed on a bottom of the storage tank, and the pusher moves between the bottom of the storage tank and the discharging opening. The three optical sensors are disposed in a sidewall of the storage tank and correspond to the storage space. The three optical sensors together form a high-level detection plane and a low-level detection plane. The control module connects the driving unit, the pusher and the three optical sensors. The control module executes the following steps according to an initial setup instruction: controlling the driving unit to drive the blade unit to move the materials, allowing a portion of the materials to enter into the storage space from the bottom opening; controlling the pusher to discharge a portion of the materials within the storage space through the discharging opening; and adjusting a default driving amount of the driving unit based on an initial detection result from the three optical sensors to generate a first driving amount.

In order to achieve the above objectives, the disclosure further provides a method for adjusting the amount discharged, which is applied in a feeding apparatus. The feeding apparatus comprises an accommodating tank, a diverting module, a discharge assembly, three optical sensors and a control module. The accommodating tank accommodates a plurality of materials and has a bottom opening. The diverting module comprises a driving unit and a blade unit, and the driving unit connects to the blade unit. The blade unit is disposed in the accommodating tank and corresponds to the bottom opening. The discharge assembly comprises a storage tank, a discharging opening and a pusher. The accommodating tank is disposed in the storage tank to form a storage space in the storage tank. The storage space is communicated with the bottom opening and the discharging opening. The pusher is disposed on a bottom of the storage tank. The three optical sensors are disposed on a sidewall of the storage tank and corresponding to the storage space. The three optical sensors together form a high-level detection plane and a low-level detection plane. The control module connects to the driving unit, the pusher and the three optical sensors. The method for adjusting the amount discharged comprises the following steps: the control module controlling the driving unit to drive the blade unit to move the materials, allowing a portion of the materials to enter into the storage space from the bottom opening; the control module controlling the pusher to discharge a portion of the materials within the storage space through the discharging opening; and the control module adjusting a default driving amount of the driving unit based on an initial detection result from the three optical sensors to generate a first driving amount. When the initial detection result indicates that the high-level detection plane is obstructed, the first driving amount is smaller than the default driving amount. When the initial detection result indicates that neither the high-level detection plane nor the low-level detection plane is obstructed, the first driving amount is greater than the default driving amount.

In an embodiment of the disclosure, when the initial detection result indicates that the high-level detection plane is obstructed, the first driving amount is smaller than the default driving amount; and when the initial detection result indicates that neither the high-level detection plane nor the low-level detection plane is obstructed, the first driving amount is greater than the default driving amount.

In an embodiment of the disclosure, when the initial detection result indicates that the high-level detection plane is not obstructed and the low-level detection plane is obstructed, the first driving amount is equal to the default driving amount.

In an embodiment of the disclosure, the three optical sensors are disposed at different heights in the storage tank such that the high-level detection plane and the low-level detection plane are oblique planes respectively.

In an embodiment of the disclosure, the high-level detection plane is a detection plane composed of three main transmission lines generated by the three optical sensors. The low-level detection plane is a detection plane composed of three sub-transmission lines generated by the three optical sensors. The strengths of the three main transmission lines are greater than the strengths of the three sub-transmission lines.

In an embodiment of the disclosure, the method for adjusting the amount discharged further comprises the following steps: the blade unit moving the materials into the storage space until the high-level detection plane is obstructed, and the control module stopping the driving unit and controlling the pusher to move toward the discharging opening.

In an embodiment of the disclosure, the feeding apparatus further comprises a pressure sensor. The pressure sensor is located near the bottom of the storage tank, and the control module connects to the pressure sensor. The control module further executes the following steps: controlling the driving unit according to a feeding instruction to drive the blade unit to move the materials using the first driving amount such that a portion of the materials enters the storage space through the bottom opening; controlling the pusher to discharge a portion of the materials within the storage space through the discharging opening; and generating a subsequent operation instruction according to a level detection result from the three optical sensors and a force detection result from the pressure sensor.

In an embodiment of the disclosure, when the level detection result indicates that the low-level detection plane is obstructed and the force detection result indicates the presence of force, the subsequent operation instruction is to control the pusher to discharge a portion of the materials within the storage space through the discharging opening.

In an embodiment of the disclosure, when the level detection result indicates that the low-level detection plane is not obstructed and the force detection result indicates the presence of force, the subsequent operation instruction is to control the driving unit according to the first driving amount to drive the blade unit to move the materials, and to control the pusher to discharge a portion of the materials within the storage space through the discharging opening.

In an embodiment of the disclosure, when the level detection result indicates that the low-level detection plane is not obstructed and the force detection result indicates the absence of force, the subsequent operation instruction is to control the driving unit according to a second driving amount to drive the blade unit to move the materials, the second driving amount being greater than the first driving amount, and to control the pusher to discharge a portion of the materials within the storage space through the discharging opening.

In an embodiment of the disclosure, when the level detection result indicates that the low-level detection plane is not obstructed and the force detection result indicates the absence of force, the subsequent operation instruction is to send a cleaning notification.

In continuation of the description above, the feeding apparatus and the method for adjusting the amount discharged of the disclosure can quantitatively provide materials. The feeding apparatus comprises an accommodating tank, a diverting module, a discharge assembly, three optical sensors and a control module. The accommodating tank accommodates a plurality of materials and is disposed in a storage tank of the discharge assembly to form a storage space within the storage tank. The three optical sensors are disposed on the sidewall of the storage tank and correspond to the storage space. The three optical sensors can form a high-level detection plane and a low-level detection plane within the storage space to detect changes in the volume of materials within the storage space. The control module can adjust a default driving amount of the driving unit of the diverting module based on an initial detection result (i.e., volume change after initial ejection) and generate a first driving amount. Then, when the feeding apparatus receives a feeding instruction, the control module can control the driving unit to operate according to the first driving amount, thereby controlling the blade unit of the diverting module to move only a small amount of materials to the storage space. The pusher of the diverting module only pushes a relatively small amount of the materials within the subsequent stage, thereby preventing a buildup of materials that could cause an interruption of the flow of the materials in the feeding apparatus or prevent the ejection of the materials from the feeding apparatus.

BRIEF DESCRIPTION OF THE DRAWINGS

FIG. 7A and FIG. 7B are flow charts of a method for adjusting the amount discharged according to an embodiment of the disclosure.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1:
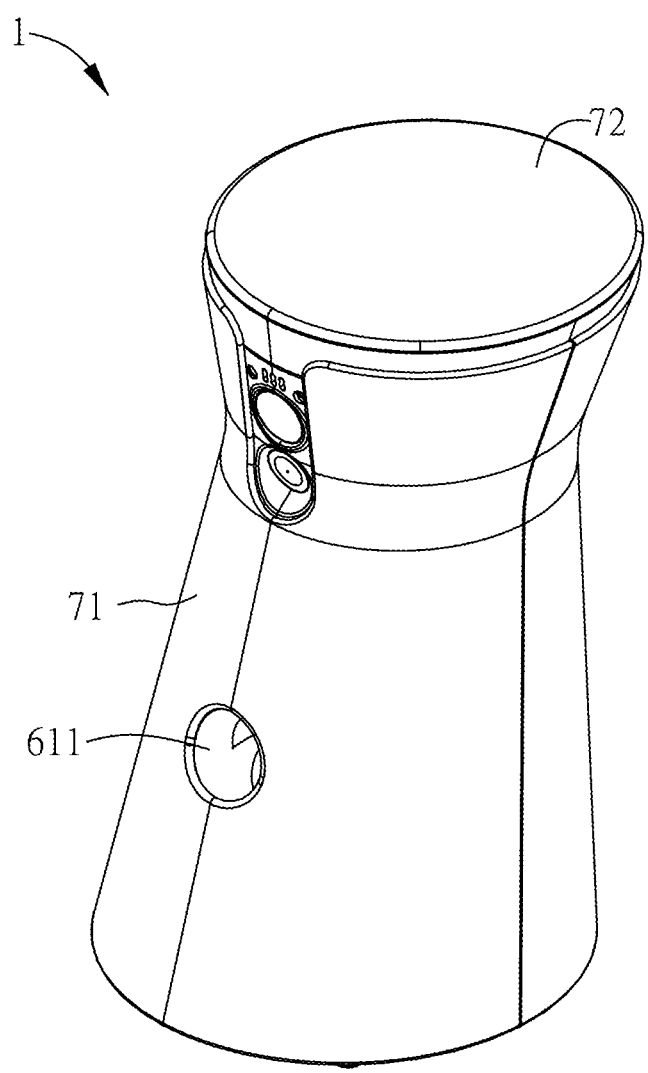
FIG. 1 is a schematic diagram of a feeding apparatus according to an embodiment of the disclosure.
Figure 2:
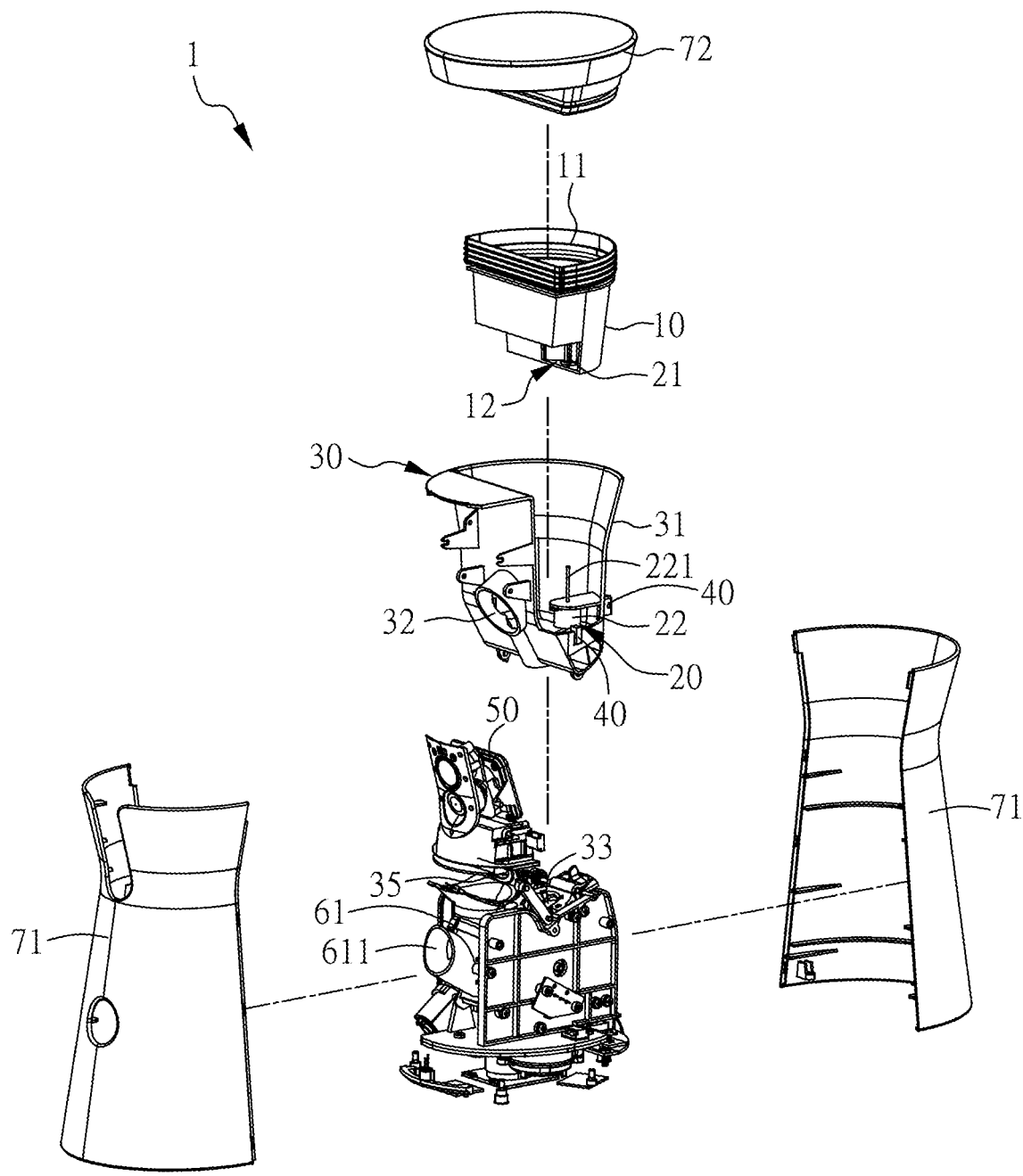
FIG. 2 is an exploded schematic diagram of the feeding apparatus shown in FIG. 1.
Figure 3:
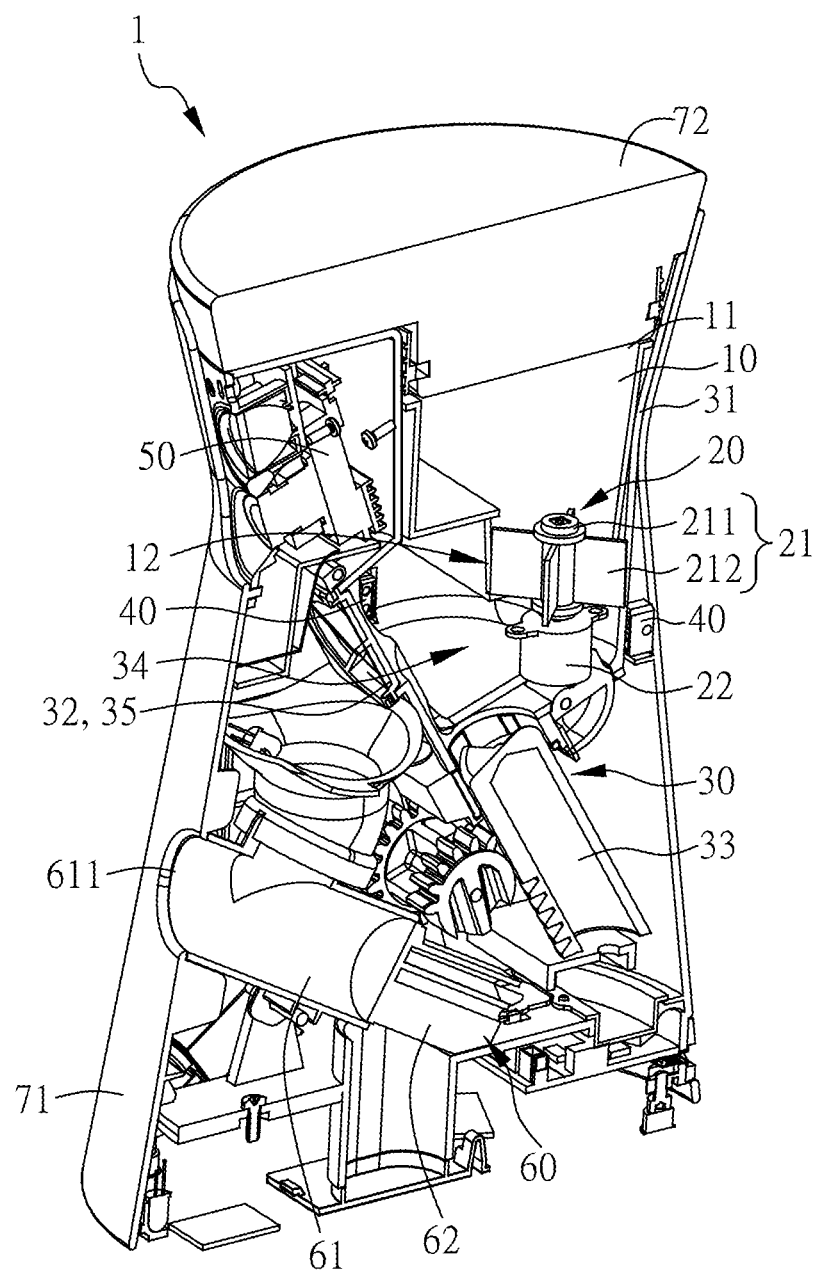
FIG. 3 is a sectional view of the feeding apparatus shown in FIG. 1.
Figure 4:
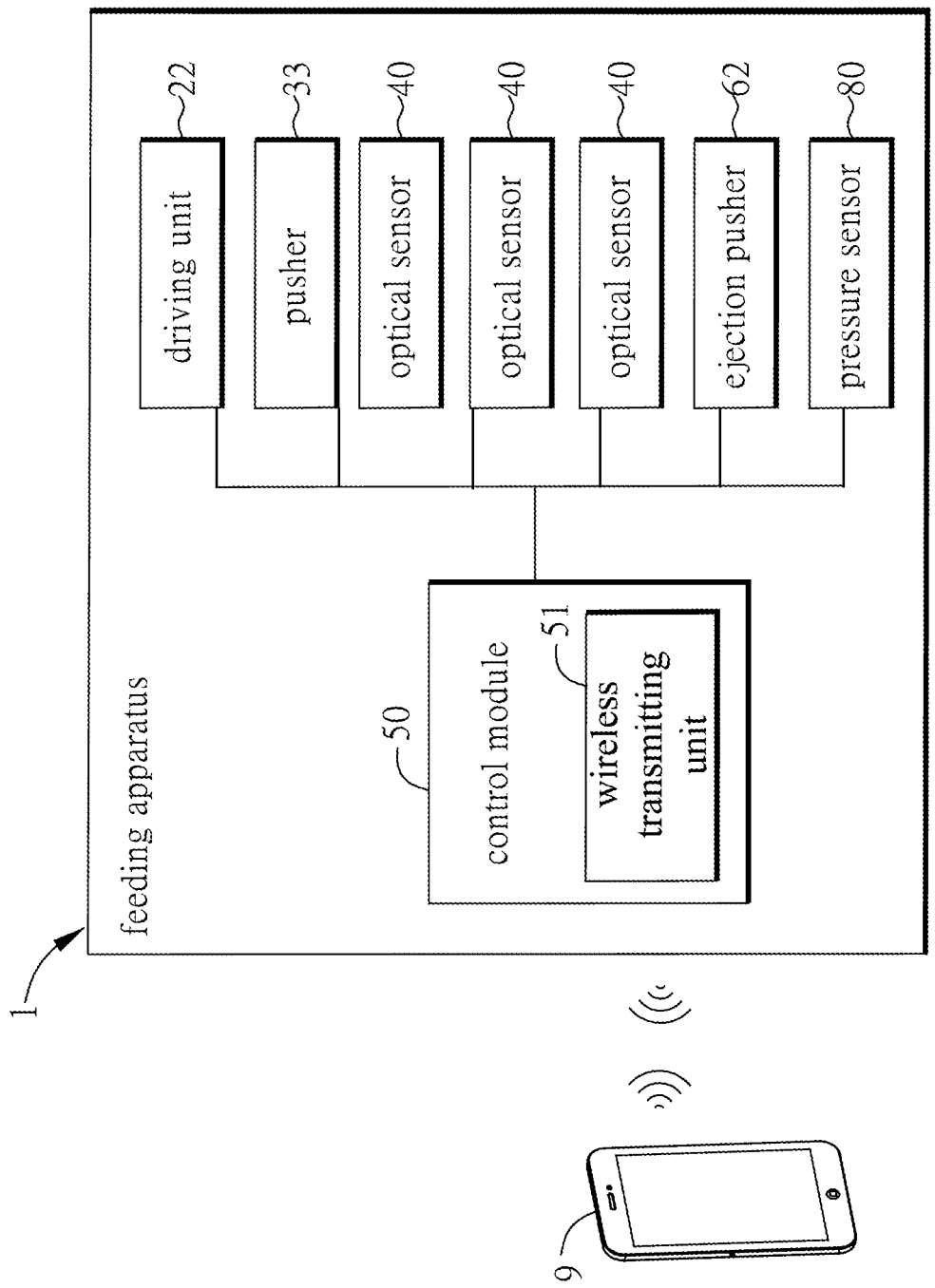
FIG. 4 is a block diagram of the feeding apparatus shown in FIG. 1.

FIG. 1 is a schematic diagram of a feeding apparatus according to an embodiment of the disclosure; FIG. 2 is an exploded schematic diagram of the feeding apparatus shown in FIG. 1; FIG. 3 is a sectional view of the feeding apparatus shown in FIG. 1; and FIG. 4 is a block diagram of the feeding apparatus shown in FIG. 1. In this embodiment, a feeding apparatus 1 is applied to an automatic feeding apparatus for propelling a quantity of pet food toward a pet to be fed to achieve the effect of feeding and interacting with a pet at the same time. In this embodiment, the pet food or a pet snack is hereinafter referred to as the material. In another embodiment, the material is a toy that the pet plays with. A user (i.e., pet owner) can put the feeding apparatus 1 in a living room, a pet playroom or the like. The feeding apparatus 1 may be set to discharge pet food regularly or be controlled remotely, thereby quantitatively providing the materials.

In this embodiment, the feeding apparatus 1 comprises an accommodating tank 10, a diverting module 20, a discharge assembly 30, three optical sensors 40 and a control module 50. The accommodating tank 10 is a tank used for accommodating the materials. The top of the accommodating tank 10 has an opening 11 for the user (i.e., pet owner) to place materials into the accommodating tank 10. In addition, the bottom of the accommodating tank 10 has a bottom opening 12.

In this embodiment, the diverting module 20 is located on the bottom of the accommodating tank 10, and it is used to move a portion of the materials within the accommodating tank 10 to the discharge assembly 30. Specifically, the diverting module 20 comprises a blade unit 21 and a driving unit 22, which are respectively disposed in the accommodating tank 10 and in a storage tank 31 of the discharge assembly 30. The blade unit 21 is disposed in the accommodating tank 10 and corresponds to the bottom opening 12. The driving unit 22 connects to the blade unit 21. In this embodiment, the driving unit 22 is a motor and a rotary shaft 221 of the motor connects to the blade unit 21 such that the driving unit 22 can connect to and drive the blade unit 21 to rotate. At this moment, a portion of the materials within the accommodating tank 10 can be moved toward the bottom opening 12 by the blade unit 21. Preferably, the blade unit 21 further comprises a shaft bearing 211 and a plurality of blades 212. The shaft bearing 211 is sleeved on the rotary shaft 221 of the driving unit 22 (with reference to FIG. 5). Preferably, the hardness of the shaft bearing 211 is greater than that of the blade 212, and the blade 212 can be made of an elastic material. A harder material is used for the shaft bearing 211 to ensure that the rotary shaft 221 of the driving unit 22 can effectively drive the shaft bearing 211 to rotate. The blade 212, which is made of an elastic material, can prevent damage to the materials and prevent them from becoming lodged with the blade 212.

In this embodiment, the control module 50 electronically connects to the driving unit 22, such that the control module 50 can control a rotation angle of the blade unit 21 driven by the driving unit 22. This enables the control module 50 to regulate the amount of material discharged from the bottom opening 12. For example, by controlling the blade unit 21 to dispense one or two grains of pet food (i.e., materials) per rotation, a quantitative feeding effect can be achieved. It should be noted that the term "relatively small amount" in disclosure, such as materials of less than three pieces, is mainly used for interacting with pets rather than just for feeding. The following describes the structural features of the diverting module 20 and the discharge assembly 30 first, and then further explains how the control module 50 controls the diverting module 20 to quantitatively provide materials.

In this embodiment, the discharge assembly 30 comprises the storage tank 31, a discharging opening 32 and a pusher 33. The accommodating tank 10 is disposed in the storage tank 31 to form a storage space 34 within the storage tank 31, as shown in FIG. 3. Specifically, in this embodiment, the accommodating tank 10 is detachably disposed in the storage tank 31. The user can remove the accommodating tank 10 from the storage tank 31 and then fill it with the materials (e.g., pet foods). In addition to facilitating the user's loading of materials, it is also easy for the user to clean the accommodating tank 10. Moreover, in this embodiment, the driving unit 22 of the diverting module 20 is disposed in the storage tank 31, and the blade unit 21 is disposed in the accommodating tank 10. When the accommodating tank 10 is installed, it is simply placed vertically into the storage tank 31, and the shaft bearing 211 of the blade unit 21 is fit into the rotary shaft 221 of the driving unit 22. Furthermore, the depth of the storage tank 31 is greater that of the accommodating tank 10. Thus, after the accommodating tank 10 is placed into the storage tank 31, a storage space 34 is formed between the bottom of the accommodating tank 10 and the bottom of the storage tank 31. Further, the storage space 34 is communicated with the bottom of the accommodating tank 10 and the bottom opening 12, which is used to receive a portion of the materials discharged from the bottom opening 12. Additionally, the discharging opening 32 of this embodiment is located on a sidewall of the storage tank 31 so that the storage space 34 can also be communicated with the discharging opening 32. In other words, the storage space 34 is communicated with both the bottom opening 12 and the discharging opening 32.

Figure 5:
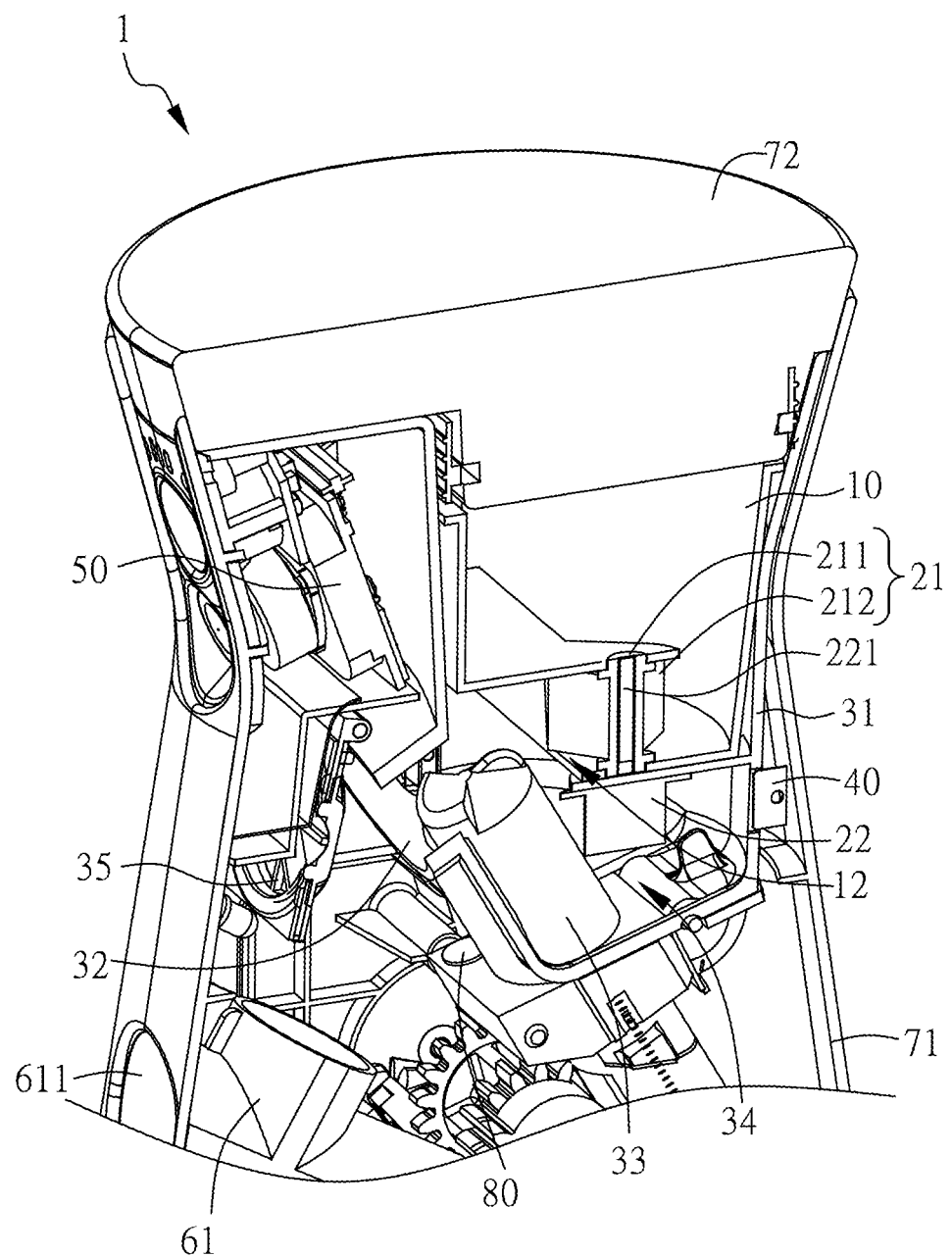
FIG. 5 is a schematic diagram of a pusher of a discharge assembly moving to a discharging opening as shown in FIG. 3.

In this embodiment, the pusher 33 of the discharge assembly 30 is disposed at the bottom of the storage tank 31 and can enter the storage space 34 to move to the discharging opening 32. In other words, the pusher 33 can move between the bottom of the storage tank 31 and the discharging opening 32 such that the materials within the storage tank 31 can be pushed to the discharging opening 32, as shown in FIG. 5. FIG. 5 is a schematic diagram of a pusher of a discharge assembly moving to a discharging opening as shown in FIG. 3. In this embodiment, the control module 50 connects to the pusher 33 to control the movement of the pusher 33. Specifically, the movement of the pusher 33 in this embodiment can be achieved by components such as motors, gear assemblies, and other similar elements. That is, the discharge assembly 30 further comprises a motor and a gear assembly, the motor electrically connects to the control module 50, and the gear assembly respectively connects to the motor and the pusher 33. Thus, the control module 50 indirectly connects to the pusher 33 and can control the movement of the pusher 33.

Preferably, the feeding apparatus 1 of this embodiment further comprises an ejection mechanism 60, as shown in FIG. 3. The ejection mechanism 60 can receive the materials that are pushed out from the discharging opening 32 and eject them from the feeding apparatus 1, thereby enhancing the interaction with pets. Specifically, the ejection mechanism 60 further comprises an ejection channel 61 and an ejection pusher 62. The ejection channel 61 is disposed below the discharging opening 32 to receive the materials that are pushed out from the discharging opening 32. Preferably, the discharge assembly 30 further comprises a valve 35, which is located between the discharging opening 32 and the ejection channel 61. It should be noted that in FIG. 3, the discharging opening 32 and the valve 35 are marked at the same position.

One end of the ejection channel 61 is an ejection outlet 611 located on the surface of the feeding apparatus 1. Preferably, in this embodiment, the feeding apparatus 1 comprises a casing 71 and a cover 72. The discharge assembly 30 and the ejection mechanism 60 are disposed on the casing 71, and the ejection mechanism 60 is located below the discharge assembly 30. Furthermore, part of the accommodating tank 10 is disposed in the storage tank 31, and the cover 72 covers the opening 11 of the accommodating tank 10. An opening is also provided on the surface of the casing 71, which is communicated with the ejection outlet 611.

Furthermore, the ejection pusher 62 is disposed at the bottom of the ejection channel 61, and the ejection pusher 62 can enter the ejection channel 61 and move toward the ejection outlet 611. Specifically, the pusher 32 pushes a portion of the materials within the storage space 34 toward the discharging opening 32. After the valve 35 is pushed open (as shown in FIG. 5) by the materials, the materials fall from the discharging opening 32 into the ejection channel 61. Then the ejection pusher 62 moves toward the ejection outlet 611 such that the materials are pushed out of the ejection outlet 611. Preferably, a portion of the ejection channel 61 and the ejection pusher 62 are tilted so that the materials can be ejected outside the feeding apparatus 1 along an upward direction. This simulates the user's action of tossing pet food and toys, which can enhance the interaction with pets.

Similarly, the ejection mechanism 60 may also have a motor and a gear assembly; the motor electrically connects to the control module 50, and the gear assembly respectively connects to the motor and the ejection pusher 62 such that the control module 50 can control the movement of the ejection pusher 62. It should be noted that in FIG. 4, for the sake of simplicity in the illustration, the control module 50 directly connects to the ejection pusher 62. The motor of the ejection mechanism 60 is activated by the control module 50 to drive the gear assembly. Further, the gear assembly drives the ejection pusher 62 to move toward the ejection outlet 611 such that the materials are moved outside of the ejection outlet 611 to complete a single ejection of the materials.

When the grain sizes of the materials are too large, the ejection pusher 62 may have difficulty pushing the materials and thus fail to eject the materials forcefully. In contrast, when the grain sizes of the materials are too small, the pusher 33 of the discharge assembly 30 may push too many materials into the ejection channel 61 at once, which may cause the ejection pusher 62 to malfunction and not work effectively. In this embodiment, the feeding apparatus 1 can provide a relatively small amount of the materials each time through the arrangement of the optical sensors 40 and a method for adjusting the amount discharged executed by the control module 50 to mitigate the aforementioned problems. The details are described as follows.

Figure 6A:
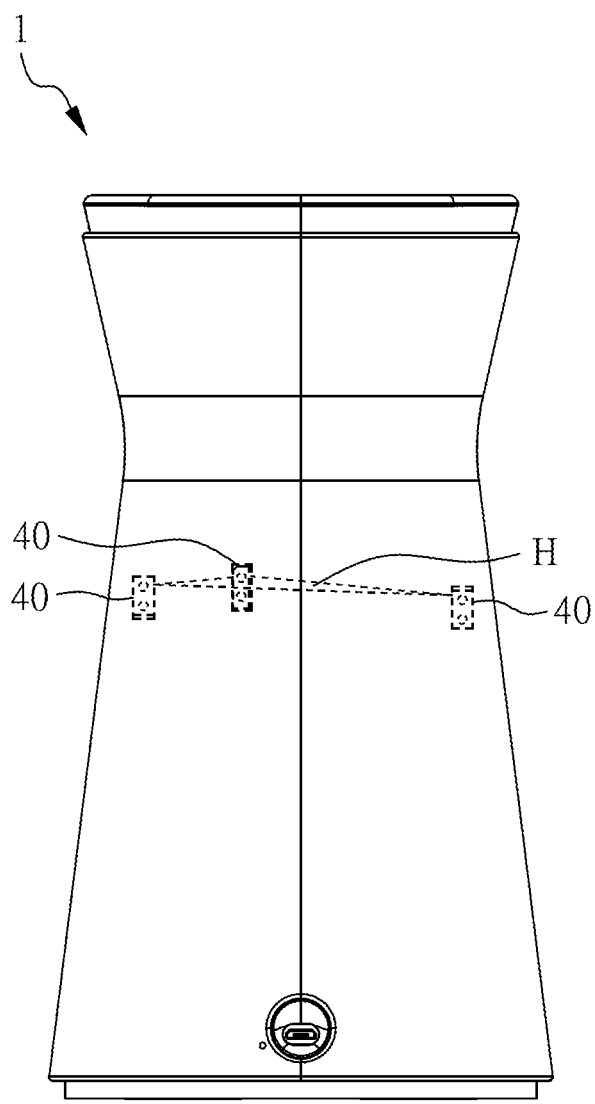
FIG. 6A and FIG. 6B are schematic diagrams of the positions of the optical sensors of the feeding apparatus as shown in FIG. 1.
Figure 6B:
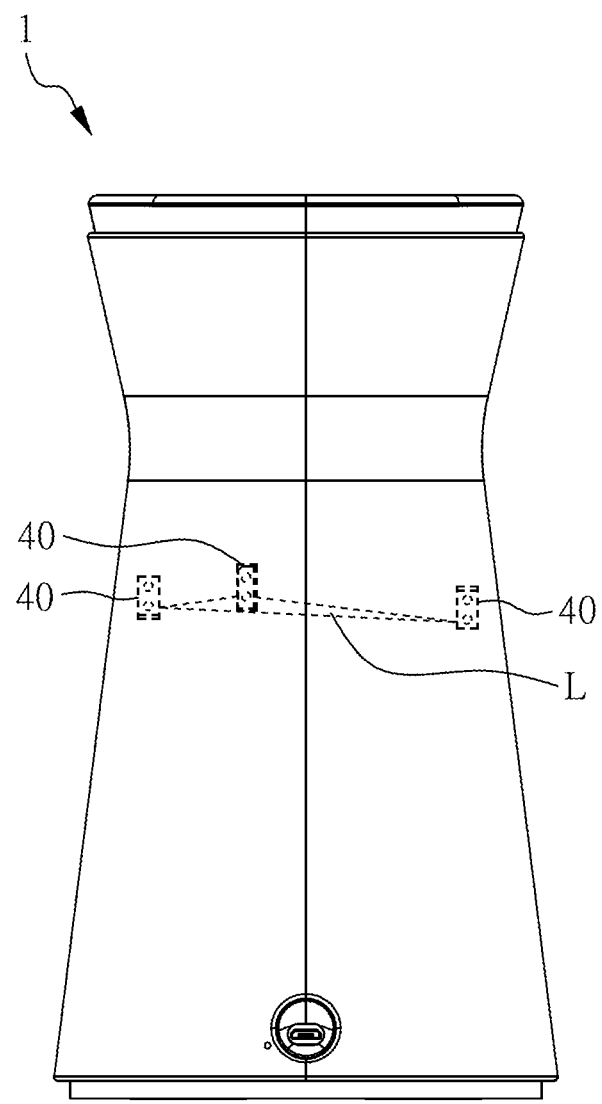

With reference to FIG. 2, FIG. 3, FIG. 6A and FIG. 6B. FIG. 6A and FIG. 6B are schematic diagrams of the positions of the optical sensors of the feeding apparatus as shown in FIG. 1. In this embodiment, the feeding apparatus 1 comprises three optical sensors 40. The three optical sensors 40 are disposed on the sidewall of the storage tank 31 and correspond to the storage space 34 for detecting the height of the materials within the storage space 34. The three optical sensors 40 can together form a high-level detection plane H (as shown in FIG. 6A) and a low-level detection plane L (as shown in FIG. 6B). Preferably, the optical sensors 40 of this embodiment are reflective optical sensors. Each optical sensor 40 can generate main transmission lines with the highest intensity as well as the sub-transmission lines with a weaker intensity. In this embodiment, the term "main transmission line" refers to a central position with the highest emission and reception intensity, which means that the receiving and emission positions are at 0 degrees relative to the central induction region. The term "sub-transmission lines" refers to a large angle position with the weaker emission and reception intensity, which means that receiving and emission positions are at 40 degrees to 50 degrees relative to the central induction region. In other words, the intensity of the main transmission line is greater than that of the sub-transmission line.

Further, in this embodiment, a detection plane formed by the three main transmission lines generated by the three optical sensors 40 is referred to as the high-level detection plane H, and a detection plane formed by the three sub-transmission lines generated by the three optical sensors 40 is referred to as the low-level detection plane L. In another embodiment, the number of the optical sensors 40 may greater than three, and the high-level detection plane H and the low-level detection plane L can also be formed by three or more optical sensors 40. The disclosure is not limited thereto.

Figure 7B:
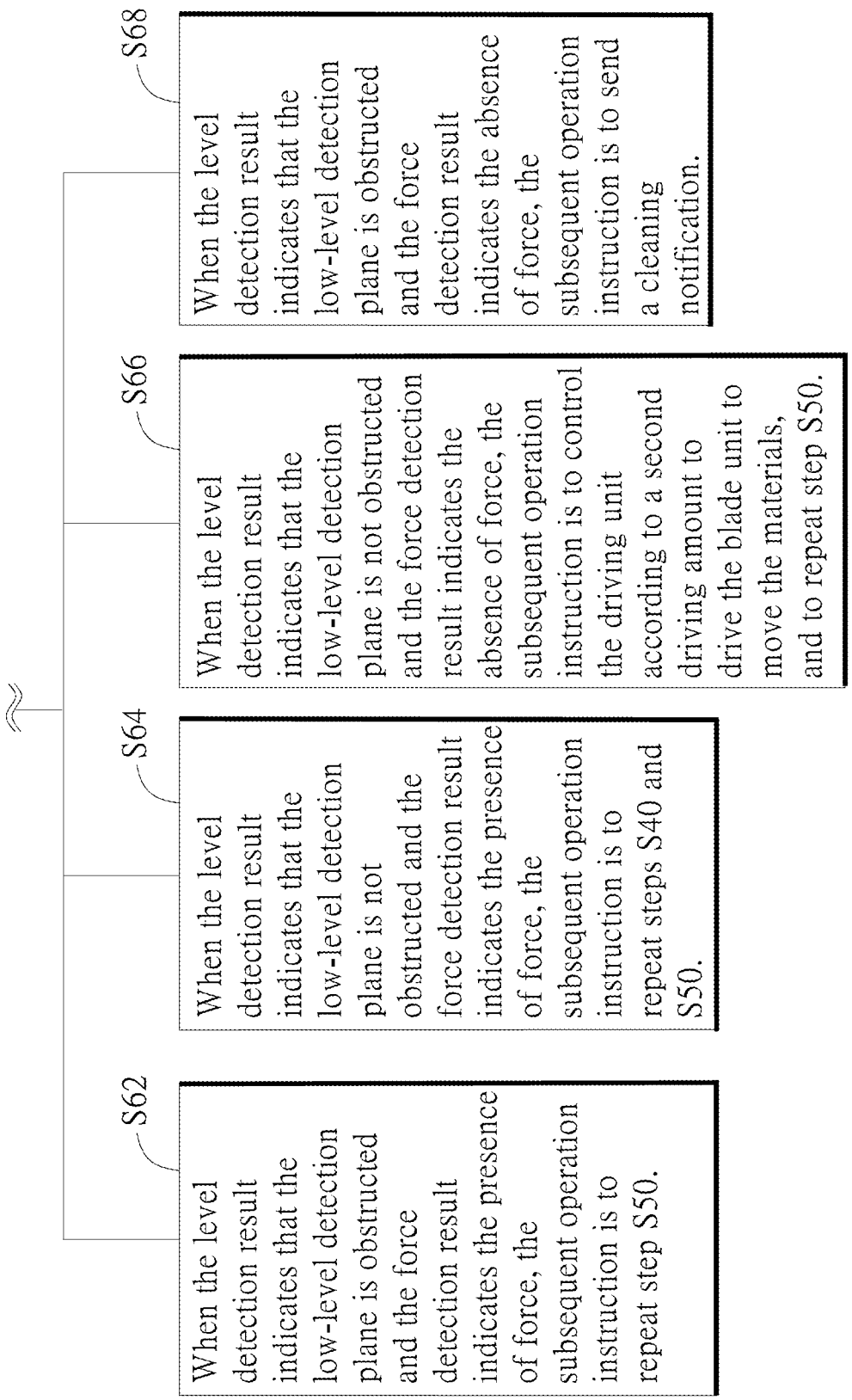

In this embodiment, the control module 50 electronically connects to the three optical sensors 40. When the high-level detection plane H or the low-level detection plane L is obstructed, the optical sensors 40 send a signal to the control module 50 so that the control module 50 can determine the height of the materials within the storage space 34 or the grain size of the material. This enables the control module 50 to adjust the amount of the material pushed out by the diverting module 20 during each operation; that is, the amount discharged can be adjusted. Specifically, the control module 50 connects to the driving unit 22, the pusher 33, the three optical sensors 40 and the pusher 62, and the control module 50 also executes the method for adjusting the amount discharged, as shown in FIG. 7A. FIG. 7A and FIG. 7B flow charts of a method for adjusting the amount discharged according to an embodiment of the disclosure. With reference to FIG. 3, FIG. 4 and FIG. 7A.

Step S10: The control module 50 controls the driving unit 22 to drive the blade unit 21 to move the materials according to an initial setup instruction such that a portion of the materials enters into the storage space 34 from the bottom opening 12.

Because the control module 50 electronically connects to the driving unit 22, when the control module 50 receives an initial setup instruction, the control module 50 activates the operation of the driving unit 22 to drive the rotation of the blade unit 21. A physical switch can be provided on the outside of the casing 71 of the feeding apparatus 1 so that the initial setup instruction can be generated by long pressing of the physical switch, and the initial setup instruction is sent to the control module 50. Preferably, the control module 50 further comprises a wireless transmitting unit 51, which is communicated with a communication device 9 (such as a smartphone or other electronic device with communication functionality) operated by the user. The user can use the communication device 9 to execute an application and send the initial setup instruction to the feeding apparatus 1.

After the wireless transmitting unit 51 receives the initial setup instruction, the control module 50 activates the operation of the driving unit 22 to drive the blade unit 21 to move the materials within the accommodating tank 10 from the bottom opening 12 to the outside of the accommodating tank 10. Because the bottom opening 12 of the accommodating tank 10 is communicated with the storage tank 31, the materials pushed out through the bottom opening 12 can directly fall into the storage space 34 of the storage tank 31.

Step S20: When the materials within the storage space 34 have accumulated to the high-level detection plane H, the control module 50 stops the driving unit 22 and controls the pusher 33 to move toward the discharging opening 32.

When the blade unit 21 moves the materials from the accommodating tank 10 into the storage space 34 until the high-level detection plane H is obstructed, the control module 50 stops the driving unit 22, and the blade unit 21 also stops moving the materials into the storage space 34. Subsequently, the control module 50 controls the pusher 33 to move toward the discharging opening 32 such that a portion of the materials within the storage space 34 can be expelled through the discharging opening 32. After that, the ejection channel 61 receives the materials. The control module 50 then operates the pusher 62 to push the materials toward the ejection outlet 611 such that the materials are discharged from the ejection outlet 611, completing the first feeding and ejection. At this point, the reduction in the volume of the materials in the storage space 34 can be used to determine the grain size of the material. This information can be used to adjust the driving amount of the driving unit 22 in the following step S30.

Step S30: The control module 50 adjusts a default driving amount of the driving unit 22 based on an initial detection result from the three optical sensors 40 to generate a first driving amount.

First, the initial detection result is the height of the materials within the storage space 34 after the initial ejection (i.e., after step S20). The default driving amount is the driving amount of the driving unit 22 that is pre-set when the feeding apparatus 1 is shipped. For example, the driving unit 22 of this embodiment is a stepping motor, and the driving amount is a step angle. In this embodiment, the default driving amount is set based on a regular grain size of the pet food (i.e., the material). For example, if the stepping motor (i.e., the driving unit 22) needs to rotate five step angles to allow the blade unit 21 to push a grain of the regular sized material into the storage space 34, the default driving amount can be set to five step angles. When the control module 50 receives a feeding instruction (with reference to the subsequent step S40), the control module 50 is pre-set to operate the driving unit 22 to rotate five step angles (i.e., the default driving amount). In step S30, the default driving amount is adjusted based on the height of the materials within the storage space 34 after the initial ejection. Thus, the first driving amount generated in the step S30 is the step angle after coarse adjustment.

In this embodiment, the optical sensors 40 can be provided based on the regular grain size of the pet food (i.e., the material) such that the height of the materials within the storage space 34 is positioned between the high-level detection plane H and the low-level detection plane L after the initial ejection (i.e., step S20). Thus, if the height of the materials within the storage space 34 is higher than the high-level detection plane H (i.e., both the high-level detection plane H and the low-level detection plane L are obstructed), then the volume of the materials within the storage space 34 has less change after the initial ejection. The above situation suggests that the grain size of the materials is smaller than the regular size, and the blade unit 21 only needs to rotate a certain amount to push a grain of the material into the storage space 34. Thus, when the high-level detection plane H is obstructed, the optical sensors 40 will send a signal to the control module 50, and the control module 50 will reduce the default driving amount of the subsequent driving amount (i.e., the first driving amount). For example, the first driving amount may be three step angles. In other words, when the initial detection result indicates that the high-level detection plane H is obstructed, the first driving amount is smaller than the default driving amount.

In contrast, if the height of the materials within the storage space 34 is lower than the low-level detection plane L (i.e., neither the high-level detection plane H nor the low-level detection plane L is obstructed), it indicates that the volume of the materials within the storage space 34 has significantly decreased after the initial ejection. The above situation suggests that the grain size of the materials is greater than the regular size, and the blade unit 21 needs to rotate a larger amount to push a grain of the material into the storage space 34. Thus, when neither the high-level detection plane H nor the low-level detection plane L is obstructed, the control module 50 will increase the default driving amount as the subsequent driving amount (i.e., the first driving amount). For example, the first driving amount may be seven step angles. In other words, when the initial detection result indicates that neither the high-level detection plane H nor the low-level detection plane L is obstructed, the first driving amount is greater than the default driving amount.

Additionally, if the height of the materials within the storage space 34 is located between the high-level detection plane H and the low-level detection plane L (i.e., the high-level detection plane H is not obstructed, and the low-level detection plane L is obstructed), it indicates that the volume of the materials within the storage space 34 decreases in a manner similar to that of pet food of a regular size. Thus, the control module 50 can directly use the default driving amount as the subsequent driving amount (i.e., the first driving amount). For example, the first driving amount is also five step angles. In other words, when the initial detection result indicates that the high-level detection plane H is not obstructed and the low-level detection plane L is obstructed, the first driving amount is equal to the default driving amount.

In this embodiment, the optical sensors 40 are disposed in the storage tank 31 to form the high-level detection plane H and the low-level detection plane L, which are used for detecting the volume changes of the materials within the storage space 34. The control module 50 can adjust the default driving amount of the driving unit 22 based on the initial detection result (i.e., the volume changes after the initial ejection) and generate the first driving amount. Subsequently, the control module 50 controls the driving unit 22 to operate according to the first driving amount when receiving the feeding instruction so as to regulate the amount of the materials that is moved into the storage space 34 by the blade unit 21. In other words, the blade unit 21 can be controlled to move only a relatively small amount of the materials into the storage space 34 such that the pusher 33 also pushes a relatively small amount of the materials (such as, a single grain of material) into the ejection channel 61. This prevents the ejection mechanism 60 from becoming jammed and being unable to eject the material.

Preferably, in this embodiment, the three optical sensors 40 are disposed at different heights in the storage tank 31. In other words, the bottom of the casing 71 of the feeding apparatus 1 serves as the reference surface, so the vertical distances from the bottom to the three optical sensors 40 are different. The three optical sensors 40 are disposed at different heights such that the high-level detection plane H and the low-level detection plane L are oblique planes respectively. It should be noted that the high-level detection plane H and the low-level detection plane L are oblique planes that are not parallel to the bottom of the casing 71. When the feeding apparatus 1 is located on a tilted surface, the materials in the storage space 34 will be tilted. Because the high-level detection plane H and the low-level detection plane L are oblique planes, misjudgments caused by tilting of the materials in the storage space 34 can be avoided. In another embodiment, the three optical sensors 40 can be disposed at the same height such that the high-level detection plane H and the low-level detection plane L are planes that are parallel to the bottom of the casing 71. The disclosure is not limited thereto.

After the control module 50 adjusts the default driving amount and generates the first driving amount, the subsequent feeding (i.e., second ejection) can be based on the coarse adjusted first driving amount, as in steps S40 and S50.

Step S40: According to a feeding instruction, the control module 50 controls the driving unit 22 using the first driving amount to drive the blade unit 21 to move the materials such that a portion of the materials enters the storage space 34 through the bottom opening 12.

Step S40 is roughly similar to step S10. When the control module 50 receives a feeding instruction, the control module 50 activates the operation of the driving unit 22 to drive the blade unit 21. The initial setup instruction can be generated by pressing the physical switch of the feeding apparatus 1. Alternatively, the initial setup instruction is sent to the wireless transmitting unit 51 of the feeding apparatus 1 by operating the communication device 9. According to the feeding instruction, the control module 50 controls the driving unit 22 using the first driving amount (i.e., the coarse adjusted driving amount) to drive the blade unit 21 to move the materials within the accommodating tank 10 from the bottom opening 12 into the storage space 34.

Step S50: The control module 50 controls the pusher 33 to discharge a portion of the materials within the storage space 34 through the discharging opening 32.

Then the control module 50 directly controls the pusher 33 to move toward the discharging opening 32 such that a portion of the materials within the storage space 34 is discharged from the discharging opening 32. After the materials are received by the ejection channel 61, the control module 50 further controls the ejection pusher 62, which moves the materials toward the ejection outlet 611. This causes the materials to be discharged through the ejection outlet 611, completing the second feeding and ejection.

In one embodiment, the subsequent feeding procedure involves the control module 50 repeating steps S40 and S50 according to each feeding instruction. Preferably, the feeding apparatus 1 further comprises a pressure sensor 80. As shown in FIG. 4, the control module 50 also electronically connects to the pressure sensor 80. With input from the pressure sensor 80, the control module 50 can more precisely adjust the discharged amount from the diverting module 20. In other words, the control module 50 fine-tunes the amount of the material from the accommodating tank 10 that is pushed into the storage space 34.

Specifically, the pressure sensor 80 is disposed on the bottom of the storage tank 31, as shown in FIG. 5. The pressure sensor 80 is used to detect the downward pressure in the storage tank 31 so that the control module 50 can determine whether the storage space 34 indeed contains the materials based on the force situation. For example, if there are materials in the storage space 34, the weight of the materials will cause a deformation in the structure of part of the pressure sensor 80 located on the bottom, which will send a signal to the control module 50. Due to the provision of the pressure sensor 80, the method for adjusting the amount discharged in this embodiment further comprises the following steps S60 to S80.

Step S60: The control module 50 generates a subsequent operation instruction according to a level detection result from the three optical sensors 40 and a force detection result from the pressure sensor 80.

When the high-level detection plane H or the low-level detection plane L is obstructed, the optical sensors 40 can send a signal the control module 50 for the control module 50 to determine the height of the accumulated materials in the storage space 34 according to this level detection result. It should be noted that the level detection result may be that the high-level detection plane H is either obstructed or unobstructed, or that the low-level detection plane L is either obstructed or unobstructed. In steps S62 to S68 of this embodiment, the determination of the control module 50 relies on whether the low-level detection plane L is obstructed or unobstructed. In another embodiment, the determination of the control module 50 can also rely on whether the high-level detection plane H is obstructed or unobstructed. The disclosure is not limited thereto.

Furthermore, the force detection result may indicate the presence or absence of force. When the storage space 34 contains the materials and its weight increases, the pressure sensor 80 can send a signal to the control module 50 for the control module 50 to determine the presence of the materials in the storage space 34 according to the force detection result (i.e., the presence of force).

The control module 50 generates a subsequent operation instruction based on the aforementioned level detection result and force detection result. The subsequent operation instruction may be the operations to be executed by the control module 50 during the next ejection (such as steps S62, S64 and S66), or the next action to be executed by the feeding apparatus 1 (such as sending a notification in step S68). It should be noted that step S60 can be further divided into four specific steps, namely, steps S62, S64, S66 and S68, as shown in FIG. 7B. In other words, step S60 provides an overview of steps S62 to S68. With reference to FIG. 4, FIG. 5, FIG. 6B, FIG. 7A and FIG. 7B simultaneously.

Step S62: When the level detection result indicates that the low-level detection plane L is obstructed and the force detection result indicates the presence of force, the subsequent operation instruction is to repeat step S50.

When the level detection result indicates that the low-level detection plane L is obstructed, it means that the height of the materials in the storage space 34 exceeds the low-level detection plane L. Further, the force detection result shows the presence of force, which confirms that the storage space 34 contains materials and there is no need to replenish the materials. Thus, step S40 of moving a portion of materials within the accommodating tank 10 to the storage space 34 can be skipped in the next feeding and ejection (i.e., the subsequent operation instruction), and instead, step S50 can be directly repeated. In other words, the control module 50 directly controls the pusher 33 to discharge a portion of the materials in the storage space 34 through the discharging opening 32.

Step S64: When the level detection result indicates that the low-level detection plane L is not obstructed and the force detection result indicates the presence of force, the subsequent operation instruction is to repeat steps S40 and S50.

When the level detection result indicates that the low-level detection plane L is not obstructed and the force detection result indicates the presence of force, it means that the storage space 34 indeed contains the materials, but the height of the materials is lower than the low-level detection plane L. In other words, there is only small amount of the materials in the storage space 34. Thus, steps S40 and S50 are directly repeated in the next feeding and ejection (i.e., the subsequent operation instruction). In brief, the control module 50 controls the driving unit 22 using the first driving amount to drive the blade unit 21 to move a portion of the materials in the accommodating tank 10 to replenish the materials to the storage space 34. Next, the control module 50 controls the pusher 33 to discharge a portion of the materials located in the storage space 34 through the discharging opening 32 (i.e., step S50). Then the control module 50 can also control the ejection pusher 62 to move the materials toward the ejection outlet 611 to discharge the materials from the ejection outlet 611 and complete the feeding and ejection.

Step S66: When the level detection result indicates that the low-level detection plane L is not obstructed and the force detection result indicates the absence of force, the subsequent operation instruction is to control the driving unit 22 according to a second driving amount to drive the blade unit 21 to move the materials, and to repeat step S50.

When the level detection result indicates that the low-level detection plane L is not obstructed and the force detection result indicates the absence of force, it means that there are almost no materials in the storage space 34. Thus, in step S66, the driving amount can be adjusted again, for example, by increasing the driving amount, to form a second driving amount. During the next feeding and ejection (i.e., the subsequent operation instruction), the blade unit 21 is driven based on the second driving amount to move a portion of the materials in the accommodating tank 10. The only difference from step S40 is the difference in driving amount. Then step S50 is repeated. That is, the control module 50 further controls the pusher 33 to discharge a portion of the materials located in the storage space 34 through the discharging opening 32.

It should be moted that the goal of step S30 is to adjust preliminarily the default driving amount to the first driving amount (i.e., through coarse adjustment), while the goal of step S66 is to further adjust the first driving amount to the second driving amount (i.e., through fine adjustment).

Step S68: When the level detection result indicates that the low-level detection plane L is obstructed and the force detection result indicates the absence of force, the subsequent operation instruction is to send a cleaning notification.

When the force detection result indicates the absence of force, it indicates the absence of materials in the storage space 34. However, the level detection result shows that the low-level detection plane L is obstructed, suggesting a potential adhesion of materials with higher viscosity to the inner wall of storage space 34. Thus, the subsequent operation instruction is to send a cleaning notification. For example, the cleaning notification is sent to the communication device 9 of the user through the wireless transmitting unit 51. Alternately, an indicator unit, such as an indicator light or indicator display, is provided on the exterior of the casing 71 to display the cleaning notification as a flashing light or as image, text, or audio information.

As described above, the feeding apparatus and the method for adjusting the amount discharged of the disclosure can quantitatively provide materials. The feeding apparatus comprises an accommodating tank, a diverting module, a discharge assembly, three optical sensors and a control module. The accommodating tank accommodates a plurality of materials and is disposed within a storage tank of the discharge assembly to form a storage space in the storage tank. The three optical sensors are disposed on the sidewall of the storage tank and correspond to the storage space. The three optical sensors can form a high-level detection plane and a low-level detection plane within the storage space to detect the volume changes of materials within the storage space. The control module can adjust a default driving amount of the driving unit of the diverting module based on an initial detection result (i.e., the volume change after the initial ejection) and generate a first driving amount. Then, when the feeding apparatus receives a feeding instruction, the control module can control the driving unit to operate according to the first driving amount and cause the blade unit of the diverting module to move only a small amount of materials to the storage space. The pusher of the diverting module only pushes a relatively small amount of the materials in the subsequent stage, thereby preventing blockage of the device and failure to eject materials from the feeding apparatus.

Although the disclosure has been explained in relation to its preferred embodiments, it is to be understood that many other possible modifications and variations can be made without departing from the spirit and scope of the disclosure as hereinafter claimed.

What is claimed is:

1. A feeding apparatus, comprising:
   an accommodating tank having a bottom opening and accommodating a plurality of materials;
   a diverting module comprising a driving unit and a blade unit, the driving unit connecting to the blade unit, and the blade unit being disposed in the accommodating tank and corresponding to the bottom opening;
   a discharge assembly comprising a storage tank, a discharging opening and a pusher, the accommodating tank being disposed in the storage tank to form a storage space in the storage tank, the storage space being communicated with the bottom opening and the discharging opening, the pusher being disposed on a bottom of the storage tank, and the pusher being moved between the bottom of the storage tank and the discharging opening;
   three optical sensors disposed on a sidewall of the storage tank and corresponding to the storage space to form a high-level detection plane and a low-level detection plane; and
   a control module connecting to the driving unit, the pusher and the three optical sensors, the control module executing the following steps according to an initial setup instruction:
   controlling the driving unit to drive the blade unit to move the materials such that a portion of the materials enters into the storage space from the bottom opening;
   controlling the pusher to discharge a portion of the materials within the storage space through the discharging opening; and
   adjusting a default driving amount of the driving unit based on an initial detection result from the three optical sensors to generate a first driving amount.

2. The feeding apparatus as claimed in claim 1, wherein, when the initial detection result indicates that the high-level detection plane is obstructed, the first driving amount is smaller than the default driving amount, and when the initial detection result indicates that neither the high-level detection plane nor the low-level detection plane is obstructed, the first driving amount is greater than the default driving amount.

3. The feeding apparatus as claimed in claim 1, wherein, when the initial detection result indicates that the high-level detection plane is not obstructed and the low-level detection plane is obstructed, the first driving amount is equal to the default driving amount.

4. The feeding apparatus as claimed in claim 1, wherein the three optical sensors are disposed at different heights in the storage tank such that the high-level detection plane and the low-level detection plane are oblique planes respectively.

5. The feeding apparatus as claimed in claim 1, wherein the high-level detection plane is a detection plane composed of three main transmission lines generated by the three optical sensors, and the low-level detection plane is a detection plane composed of three sub-transmission lines generated by the three optical sensors, wherein the strengths of the three main transmission lines are greater than the strengths of the three sub-transmission lines.

6. The feeding apparatus as claimed in claim 1, wherein, when the blade unit moves the materials into the storage space until the high-level detection plane is obstructed, the control module stops the driving unit and controls the pusher to move toward the discharging opening.

7. The feeding apparatus as claimed in claim 1, further comprising:
    a pressure sensor located near the bottom of the storage tank, the control module connecting to the pressure sensor, and the control module further executing the following steps:
    controlling the driving unit according to a feeding instruction to drive the blade unit to move the materials using the first driving amount such that a portion of the materials enters the storage space through the bottom opening;
    controlling the pusher to discharge a portion of the materials within the storage space through the discharging opening; and
    generating a subsequent operation instruction according to a level detection result from the three optical sensors and a force detection result from the pressure sensor.

8. The feeding apparatus as claimed in claim 7, wherein, when the level detection result indicates that the low-level detection plane is obstructed and the force detection result indicates the presence of force, the subsequent operation instruction is to control the pusher to discharge a portion of the materials within the storage space through the discharging opening.

9. The feeding apparatus as claimed in claim 8, wherein, when the level detection result indicates that the low-level detection plane is not obstructed and the force detection result indicates the absence of the force, the subsequent operation instruction is to control the driving unit according to a second driving amount to drive the blade unit to move the materials, the second driving amount being greater than the first driving amount, and to control the pusher to discharge a portion of the materials within the storage space through the discharging opening.

10. The feeding apparatus as claimed in claim 8, wherein, when the level detection result indicates that the low-level detection plane is not obstructed and the force detection result indicates the absence of the force, the subsequent operation instruction is to send a cleaning notification.

11. The feeding apparatus as claimed in claim 7, wherein, when the level detection result indicates that the low-level detection plane is not obstructed and the force detection result indicates the presence of force, the subsequent operation instruction is to control the driving unit according to the first driving amount to drive the blade unit to move the materials and to control the pusher to discharge a portion of the materials within the storage space through the discharging opening.

12. A method for adjusting the amount discharged, applied in a feeding apparatus, the feeding apparatus comprising an accommodating tank, a diverting module, a discharge assembly, three optical sensors and a control module; the accommodating tank accommodating a plurality of materials and having a bottom opening; the diverting module comprising a driving unit and a blade unit; the driving unit connecting to the blade unit; the blade unit being disposed in the accommodating tank and corresponding to the bottom opening; the discharge assembly comprising a storage tank, a discharging opening and a pusher; the accommodating tank being disposed in the storage tank to form a storage space in the storage tank; the storage space being communicated with the bottom opening and the discharging opening; the pusher being disposed on a bottom of the storage tank; the three optical sensors being disposed on a sidewall of the storage tank and corresponding to the storage space to form a high-level detection plane and a low-level detection plane; the control module connecting to the driving unit, the pusher and the three optical sensors; the method for adjusting the amount discharged comprising the following steps:
    the control module controlling the driving unit to drive the blade unit to move the materials such that a portion of the materials enters into the storage space from the bottom opening;
    the control module controlling the pusher to discharge a portion of the materials within the storage space through the discharging opening; and
    the control module adjusting a default driving amount of the driving unit based on an initial detection result from the three optical sensors to generate a first driving amount; wherein,
    when the initial detection result indicates that the high-level detection plane is obstructed, the first driving amount is smaller than the default driving amount; and
    when the initial detection result indicates that neither the high-level detection plane nor the low-level detection plane is obstructed, the first driving amount is greater than the default driving amount.

13. The method for adjusting the amount discharged as claimed in claim 12, wherein, when the initial detection result indicates that the high-level detection plane is not obstructed and the low-level detection plane is obstructed, the first driving amount is equal to the default driving amount.

14. The method for adjusting the amount discharged as claimed in claim 12, further comprising the following steps:
    when the blade unit moves the materials into the storage space until the high-level detection plane is obstructed, the control module stopping the driving unit and controlling the pusher to move toward the discharging opening.

15. The method for adjusting the amount discharged as claimed in claim 12, wherein the feeding apparatus further comprises a pressure sensor located near the bottom of the storage tank, the control module connects to the pressure sensor, and the method further comprises the following steps:

the control module controlling the driving unit according to a feeding instruction to drive the blade unit to move the materials using the first driving amount such that the portion of the materials enters the storage space through the bottom opening;

the control module controlling the pusher to discharge the portion of the materials within the storage space through the discharging opening; and the control module generating a subsequent operation instruction according to a level detection result from the three optical sensors and a force detection result from the pressure sensor.

16. The method for adjusting the amount discharged as claimed in claim 15, wherein, when the level detection result indicates that the low-level detection plane is obstructed and the force detection result indicates the presence of force, the subsequent operation instruction is to control the pusher to discharge the portion of the materials within the storage space through the discharging opening.

17. The method for adjusting the amount discharged as claimed in claim 16, wherein, when the level detection result indicates that the low-level detection plane is not obstructed and the force detection result indicates the absence of the force, the subsequent operation instruction is to control the driving unit according to a second driving amount to drive the blade unit to move the materials, the second driving amount being greater than the first driving amount, and to control the pusher to discharge the portion of the materials within the storage space through the discharging opening.

18. The method for adjusting the amount discharged as claimed in claim 16, wherein, when the level detection result indicates that the low-level detection plane is not obstructed and the force detection result indicates the absence of the force, the subsequent operation instruction is to send a cleaning notification.

19. The method for adjusting the amount discharged as claimed in claim 15, wherein, when the level detection result indicates that the low-level detection plane is not obstructed and the force detection result indicates the presence of force, the subsequent operation instruction is to control the driving unit according to the first driving amount to drive the blade unit to move the materials and to control the pusher to discharge a portion of the materials within the storage space through the discharging opening.

* * * * *